Figure 1:
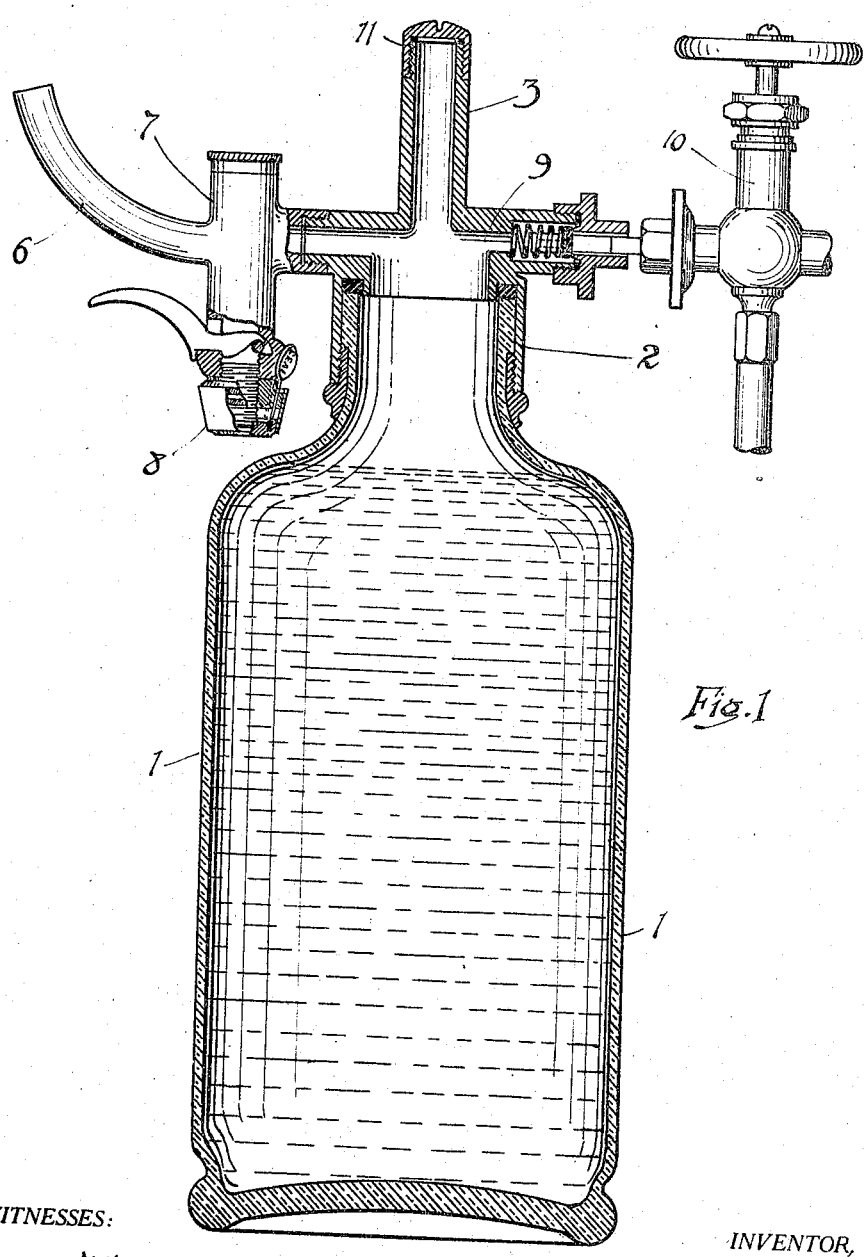

No. 881,420.

D. LANDAU.
SIPHON BOTTLE.
APPLICATION FILED MAY 23, 1907.

PATENTED MAR. 10, 1908.

2 SHEETS—SHEET 1.

WITNESSES:
Geoffrey Holt
H. Taylor

INVENTOR,
D. Landau
BY
F. M. Wright,
ATTORNEY.

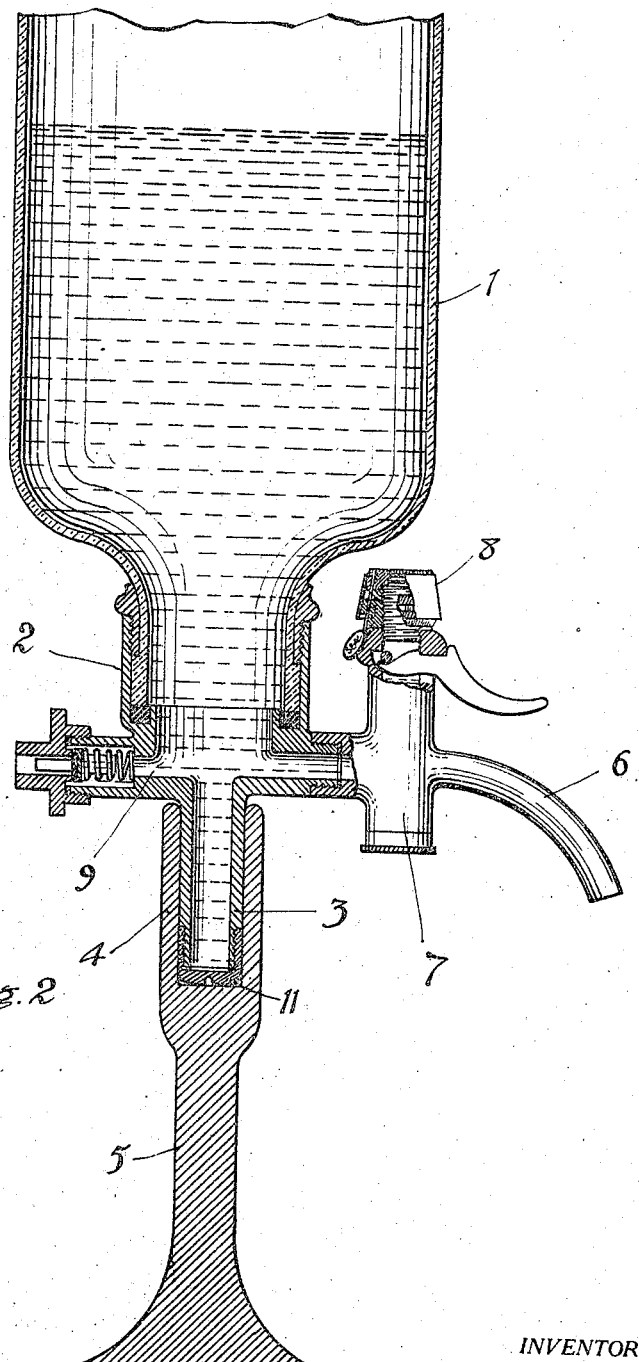

UNITED STATES PATENT OFFICE.

DEWIS LANDAU, OF SAN FRANCISCO, CALIFORNIA, ASSIGNOR TO LANDAU ECONOMIC SYPHON COMPANY, OF SAN FRANCISCO, CALIFORNIA, A CORPORATION OF CALIFORNIA.

SIPHON-BOTTLE.

No. 881,420.     Specification of Letters Patent.     Patented March 10, 1908.

Application filed May 23, 1907. Serial No. 375,323.

*To all whom it may concern:*

Be it known that I, DEWIS LANDAU, a citizen of the United States, residing at San Francisco, in the county of San Francisco and State of California, have invented new and useful Improvements in Siphon-Bottles, of which the following is a specification.

This invention relates to improvements in siphon bottles, the object of the invention being to provide a bottle for containing carbonated liquids which will permit of the liquids being bottled at a much lower pressure than heretofore while not impairing the free flow of the liquid. Thus, with siphon bottles as ordinarily used for containing beer, bottled at, say, fifty pounds pressure, the beer, when dispensed from the siphon bottle, escapes therefrom with such violence as to produce a great amount of foam, on account of the beer having to pass at a high pressure through the tube of the siphon and through the openings therefrom. The result is that it takes a long time to draw a glass of beer sufficiently free from foam. On the other hand, if the pressure is reduced, so as to reduce the quantity of foam caused in drawing the beer, the result is that the pressure is then insufficient to expel the beer, and the flow of the beer from the siphon bottle stops. The present construction permits the siphon bottle to be inverted when drawing the beer or other liquid, and the arrangement is such that the pressure of the gas within the siphon bottle now presses down upon the top of the liquid so that the pressure of the gas is assisted by the weight of the liquid, and thus even the very smallest pressure of gas within the siphon is sufficient to expel the liquid therefrom. With this construction, therefore, the pressure may now be considerably reduced, and there is no danger of the siphon bottles bursting, as has not infrequently happened with the high pressures formerly employed.

A siphon constructed in accordance with this invention can be connected direct to the barrel of beer or other liquid, and the beer can be transferred from the barrel to the siphon without losing any of the gas or diminishing the gaseous pressure, and the pressure of the gas contained in the barrel, and partly transferred to the siphon bottle connected therewith, will be sufficient to expel the beer. It results also from this that the beer or other liquid dispensed from such siphon bottle will always be fresh.

In the accompanying drawings, Figure 1 is a broken vertical section of the siphon, showing it in position when being charged; Fig. 2 is a vertical section of the siphon in use.

Referring to the drawing, 1 indicates the body of the siphon, and 2 the head thereof. In this siphon the long tube ordinarily used, extending from the top of the siphon into close proximity with the bottom, is dispensed with, and the bottle is adapted to be used in an inverted position. For this purpose the head 2 is formed with an upward tubular extension 3, which is adapted to be inserted in a socket 4 in a stand 5. When the bottle is inverted and placed in said stand, as shown in Fig. 2, its spout 6 is then suitably directed to discharge the liquid from the siphon into a drinking glass, or other vessel, placed on the table supporting the stand, and beneath said spout. I preferably use a valve 7 such as that shown in my United States Patent No. 835,443, dated Nov. 6, 1906, for controllers for liquid receptacles which is provided with a lock and regulator as by means of the lock and regulator 8 the valve can be locked on putting away the siphon, so that no gas can escape therefrom, and the contents will remain fully charged. On using the bottle the lock and regulator are released and the valve can be opened. But it will also be understood that while I have herein shown one form of valve for opening the siphon and permitting the liquid to escape therefrom, my invention is not limited to the particular valve here shown, as any suitable valve may be used for this purpose.

No change is required in the method of filling the siphon, and the siphon is formed with a filling inlet 9 and is filled by means of a charging apparatus 10, such as are shown in my U. S. Patent for charging apparatus, No. 816,985 dated April 3, 1906, and for this purpose also the pipe coupling may be employed, for which U. S. Patent was granted to me Feb. 27th, 1906, No. 813,437, so that, as regards the filling of the bottle, it is filled in the ordinary position, standing upon its base, but to dispense the liquid therefrom, the bottle is inverted.

One of the most important advantages of the present form of siphon is that, because the long tube usually found in said bottles is now dispensed with, and also because of the construction of the bottle, the interior of the bottle is readily accessible, so that it can be easily cleaned out for further use. This is effected by merely unscrewing the cap 11 or the extension 3, which allows of access to the interior of the bottle. Thus it is no longer necessary that the siphon bottles should be sent to a bottling establishment to be refilled, as when used in saloons for dispensing beer the attendant can himself easily clean the siphon and refill from the barrel. In the same way, when used in households, the siphon can be filled from a barrel of beer and can be readily cleaned before each filling.

I claim:—

A bottle having a body and a head, said head having a spout with an upwardly directed outlet and a valve controlling said spout, and having an upward tubular extension adapted, when the bottle is inverted, to fit in a socket in a stand, and a cap removably closing said extension, substantially as described.

In testimony whereof I have hereunto set my hand in the presence of two subscribing witnesses.

DEWIS LANDAU.

Witnesses:
C. L. Howe,
D. B. Richards.